Figure 1:
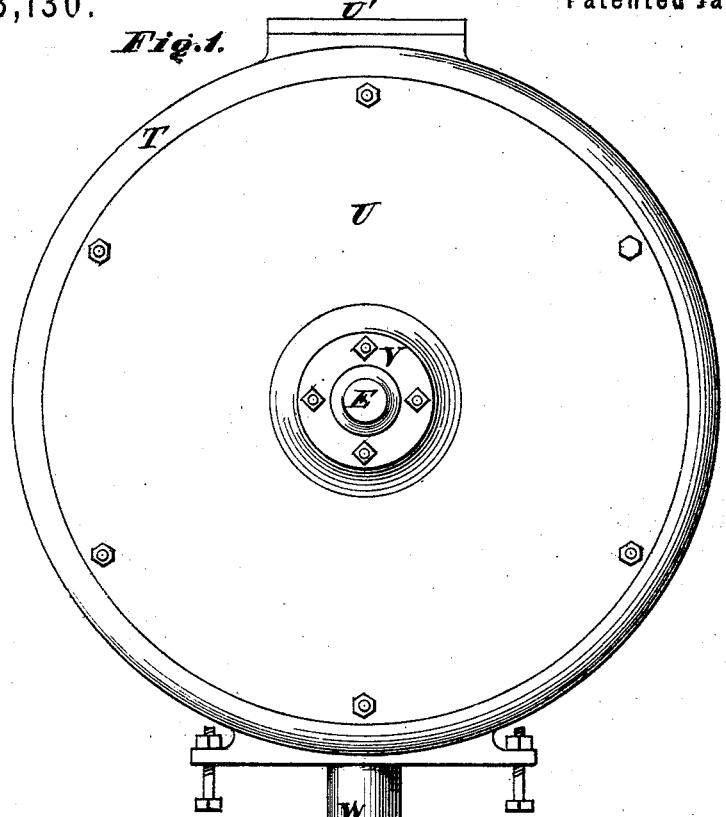
Figure 2:
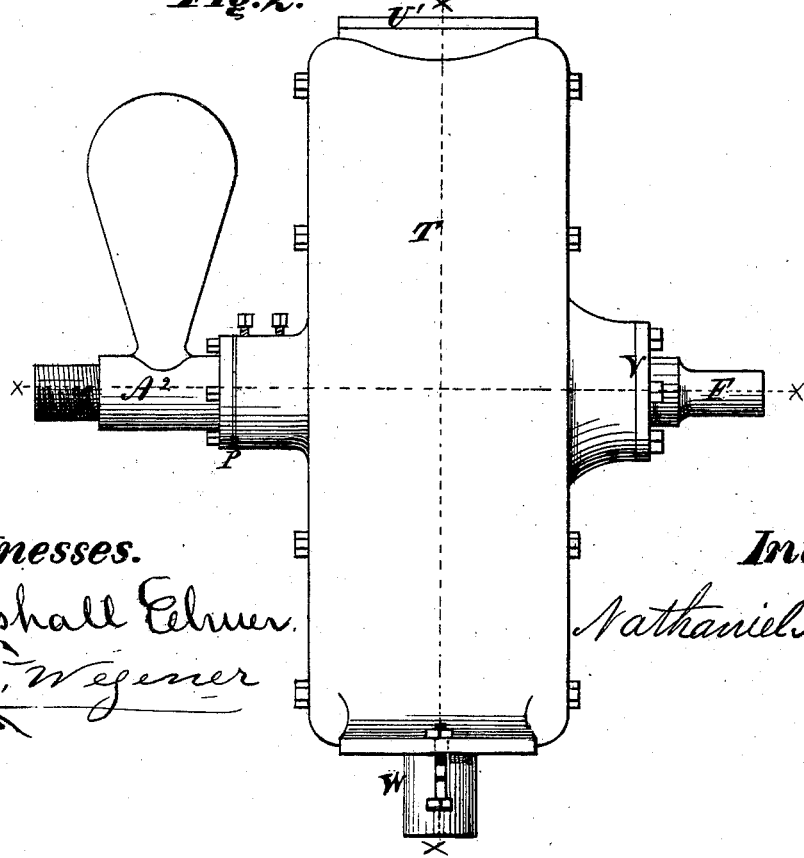
Figure 4:
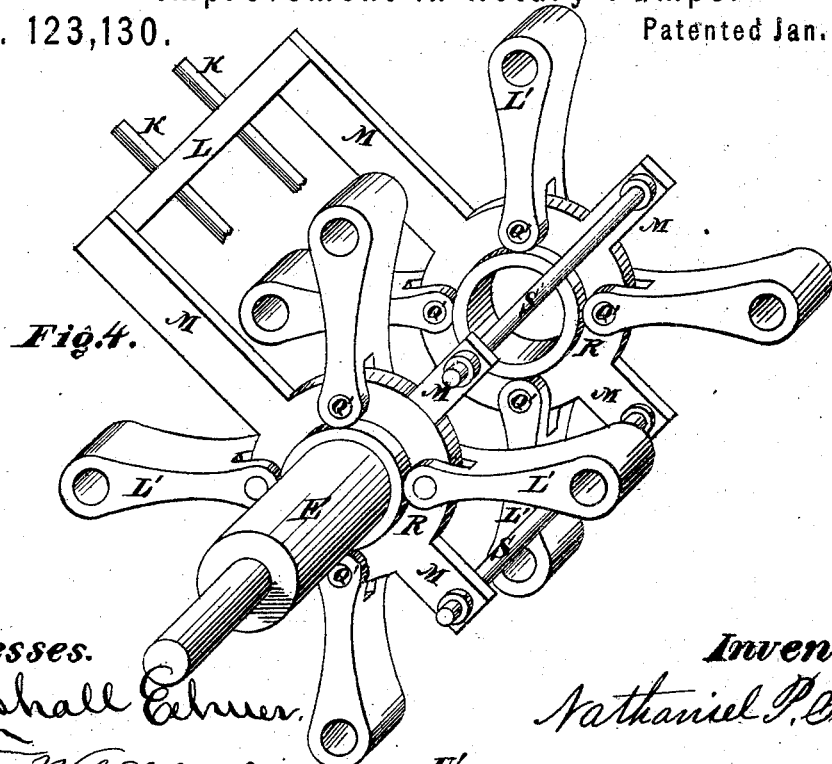
Figure 3:
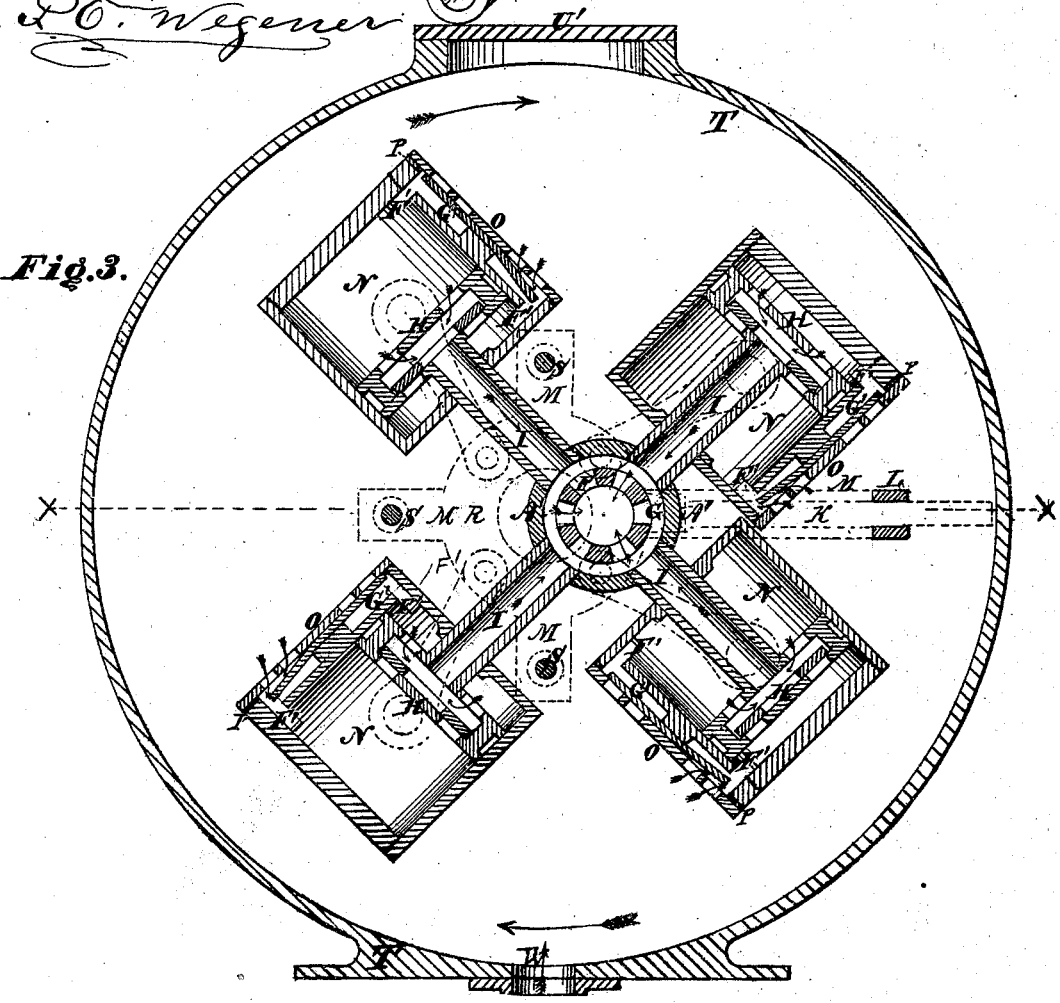
Figure 5:
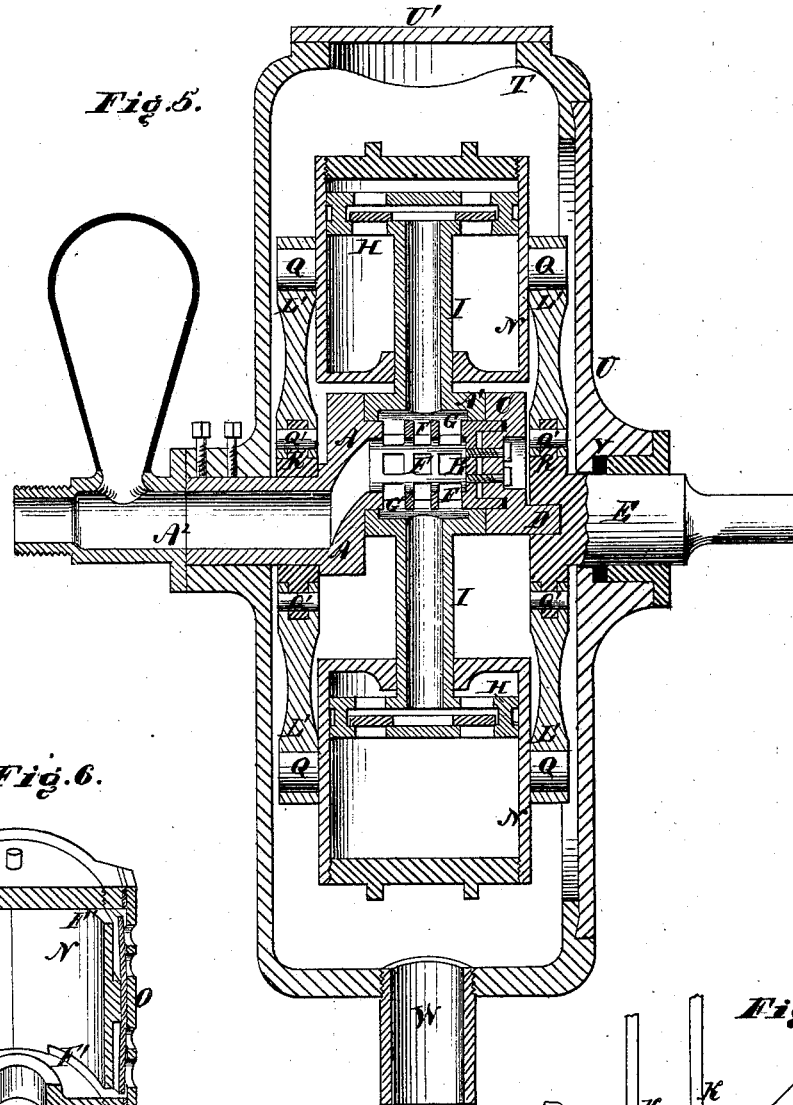
Figure 6:
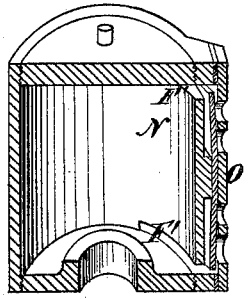
Figure 7:
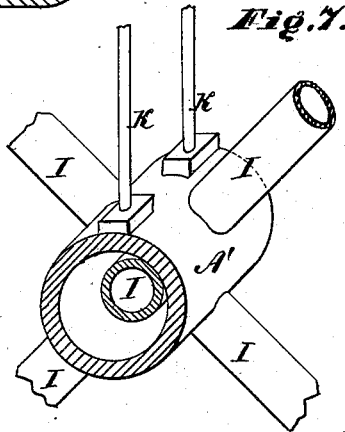

N. P. SHELDON.
Improvement in Rotary Pumps.

No. 123,130.

Patented Jan. 30, 1872.

Witnesses.
Marshall Elmer
F. C. Wegener

Inventor.
Nathaniel P. Sheldon

N. P. SHELDON.
Improvement in Rotary Pumps.

No. 123,130. Patented Jan. 30, 1872.

Witnesses.
Marshall Ehrner
L. C. Wegener

Inventor.
Nathaniel P. Sheldon

N. P. SHELDON.

Improvement in Rotary Pumps.

No. 123,130. Patented Jan. 30, 1872.

Witnesses.
Marshall Ehner
L. C. Wegener.

Inventor:
Nathaniel P. Sheldon.

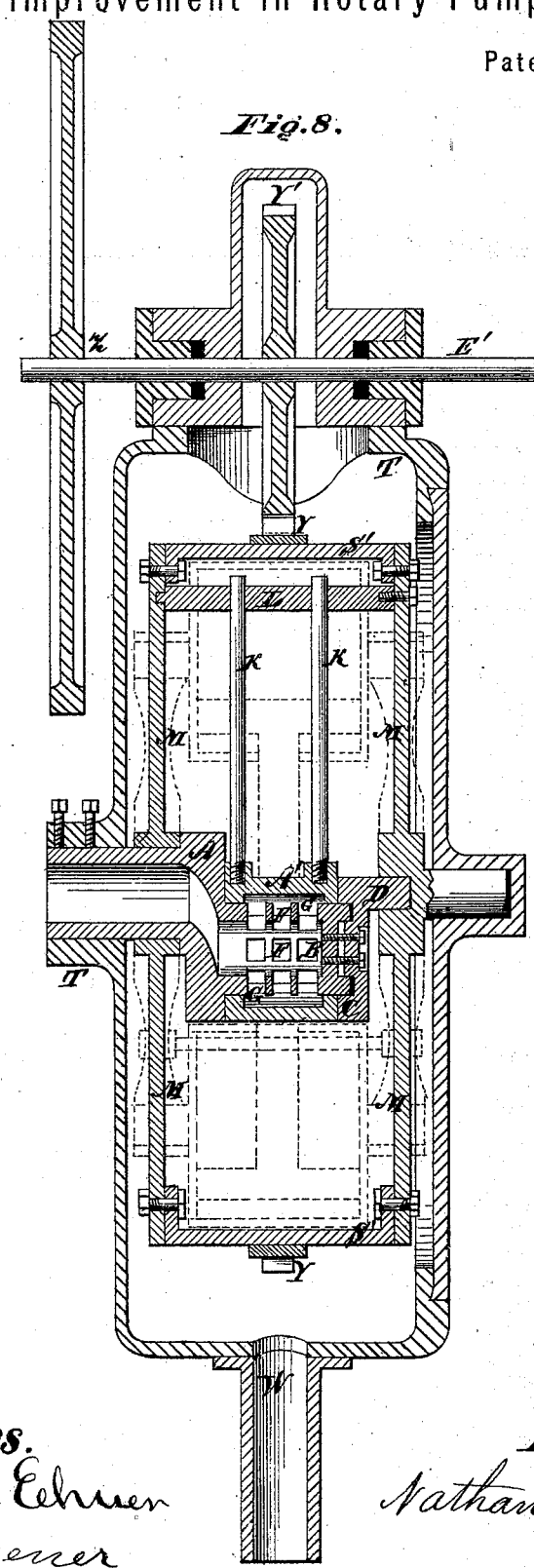

UNITED STATES PATENT OFFICE.

NATHANIEL P. SHELDON, OF SAN FRANCISCO, CALIFORNIA.

IMPROVEMENT IN ROTARY PUMPS.

Specification forming part of Letters Patent No. 123,130, dated January 30, 1872.

I, NATHANIEL P. SHELDON, of the city and county of San Francisco and State of California, have made certain Improvements in Pumps, of which the following is a specification:

Nature and Objects of the Invention.

The invention herein described relates to that class of pumps known as rotary pumps, in which the cylinders and plungers revolve together; and its object is to lessen the amount of power required to pump fluids under a given pressure, and to make the cylinders double-acting. The first part of my invention relates to the combination of the receiving-section of the discharge-pipe with a detached section, in such a manner that said detached section shall revolve around the receiving-section. The second part of my invention relates to the combination of the revolving-section of the discharge-pipe with plungers and cylinders, in such a manner that the fluids upon which the pump is operated may pass from the cylinders through the plungers and plunger-rods into the discharge-pipe. The third part of my invention relates to the combination of the cylinders with oscillating arms and driving-gear, in such a manner that while the cylinders and plungers revolve around separate centers the cylinders are kept upon a radial line with the plungers and made to pass back and forth over them during every revolution of the pump, thereby causing the suction and discharge.

Description of the Accompanying Drawing.

Figure one, (1,) Sheet one, (1,) is a side elevation of a machine embodying my invention. Fig. two, (2,) Sheet one, (1,) is an end elevation. Fig. three, (3,) Sheet two, (2,) is a transverse vertical section, showing those parts of the machine cut by the perpendicular line X X, drawn through Fig. two, (2.) The dotted lines in this figure represent the oscillating arms and the driving-gear upon one side of the cylinder. Fig. four, (4,) Sheet two, (2,) is an elevation, showing the driving-gear in perspective. Fig. five, (5,) Sheet three, is a transverse vertical section, showing those parts of the machine cut by the horizontal line X X, drawn through Fig. two, (2.) Fig. six, (6,) Sheet three, (3,) is a transverse vertical section of a cylinder in perspective. Fig. seven, (7,) Sheet three, (3,) is an elevation, showing the revolving-section of the discharge-pipe in perspective, with fragmentary portions of the driving-pins and plunger-rods or pipes. Fig. eight, (8,) Sheet four, (4,) is a transverse vertical section, showing a mode of driving the pump by gear-wheels.

The drawing, with the description herein given, represents a pump with the valves so arranged as to receive fluids from the outside, and discharge them through the center; but by placing the valves upon the outside of the valve-seats the said action will be reversed, the fluids received through the center and discharged at the outside thereby reversing the respective offices of the suction and discharge-pipes, as herein described. The pump may also be used as a submerged pump by dispensing with the shell and substituting a frame with proper bearings for the shaft and discharge-pipe.

General Description.

In the drawing, A is a section of the discharge-pipe in the center of the pump, made in the form of a hollow crank, the distance between the centers of the two arms of which represents one-half of the length of the stroke. Upon the inner arm is a shoulder against which one end of the revolving section A' rests, holding it in place. The section A is closed by the head B, beyond which the pipe extends for a short distance, forming a seat for the plug C, which is screwed to the head B by set-screws. This plug forms a shoulder for one end of the revolving section A'. The pin D projecting from the plug C, and resting in the driving-shaft E, is for holding the discharge-pipe firmly in place under a heavy pressure. The open ports F in pipe A are passage-ways from the chamber G between the bearings of the pipe A' to the discharge-pipe. The plungers H are attached to the revolving section A' by the hollow pipes or plunger-rods I. The driving-pins K, which pass through the oscillating bars L suspended in the arms M, are also attached to said revolving section. The cylinders N are closed at each end, the inner end being cast with the cylinders, and the outer end inserted by screws or other device. The ports F', near each end of the cylinders, are passages from the chambers between the plungers and the ends of the cylinders to the chambers G', between the cylinders and the plates or valve-seats O, in which are the receiving-ports for the cylinders. P is a sheet of leather or rubber between the plates O and the cylinders, and is so cut inside of the bearings around the chambers G' as to form valves for the ports. The cylinders N are hung by the axles Q in the oscillating arms L' attached to the flanges R, with loose joints formed by the axles Q'. One of the flanges R is cast with the driving-shaft E, and the other forms a collar which revolves around the discharge-pipe A. Of the four arms M extending from each of the flanges R, three of each are bolted together by the rods S. The other two form bearings for the oscillating bar L. The flanges R with their attachments, as shown in Fig. four, (4,) Sheet two, (2,) form the driving-gear for the pump. T is a shell surrounding the pump as thus constructed, and forming a vacuum or suction-chamber, in which the cylinders revolve. The opening in the shell covered by the plate U should be of sufficient size to admit the working portions of the pump, and the opening in the top covered by the plate U' large enough to admit a single cylinder. V is a stuffing-box around the shaft E. The discharge-pipe A passes through the center of the shell opposite the shaft, and must be rigidly secured by set-screws or other device. $A^2$ is a section of the discharge-pipe bolted to the shell, and to which an air-chamber may be attached, as seen in the drawing. W is a section of suction-pipe attached to the shell. By extending the arms M upon each of the flanges R, as seen in Fig. eight, (8,) to a point outside of the cylinders, and connecting them by the bars S', as seen in said figure, the gear-wheels Y may be attached to them, and the pump run by the pinion-gears Y' on the driving-shaft E, upon which is the fly-wheel Z, or rods may be extended from the plungers through the cylinders, and the gear-wheel Y attached thereto. The long arrows in Fig. three (3) indicate the direction in which the pump is intended to be run, thus keeping the ports in the plates O moving against the fluid in the suction-chamber T, thereby assisting the passage of water into the cylinders; but the pump may be run either way, or with an oscillating motion, it desired. The valve-seats for the cylinders, with their accompanying ports, may be on the ends of the cylinders instead of on the sides, if so desired. The short arrows in Fig. three (3) indicate the direction of the currents of fluid from its reception to its discharge. The lines X X drawn across Fig. three (3) indicate the cut-off points between the suction and discharge. From the right hand of said line to the left, following the direction of the large arrows, the inner ends of the cylinders are discharged through the plunger-rods, and the outer ends filled from the suction-chamber T. From the left hand of said line to the right, following the same direction, the outer ends are being discharged and the inner ones filled, thus keeping up a constant suction and discharge in all of the cylinders when the pump is in motion.

For use in pumping air I place the suction-port in the upper part of the shell, and a sufficiency of oil or water in the shell to fill the discharge-pipe for a short distance and pass the air through it, the greater weight of said fluids keeping them to the bottom, while any leakage back into the shell is taken up through the ports in the outer ends of the cylinders, thus keeping the parts exposed to friction constantly lubricated.

I claim as my invention—

1. The combination of the cylinders N and pistons H with the cranked discharge-pipe A, substantially as set forth; and 2. In combination with the above-claimed devices, I claim the arms L', substantially as described.

3. I also claim the driving-pins K K, in combination with the driving-gears Y and Y', for the purpose of keeping the cylinders and plungers moving together around their respective centers.

4. I also claim the combination of the cylinders N with the oscillating arms L' and the flanges R, for the purpose of traversing the cylinders, substantially as described.

NATHANIEL P. SHELDON.

Witnesses:
F. O. WEGENER,
MARSHALL ELMER.